US008645296B2

(12) United States Patent
Proctor et al.

(10) Patent No.: US 8,645,296 B2
(45) Date of Patent: Feb. 4, 2014

(54) KNOWLEDGEBASE PARTITIONING

(75) Inventors: Mark Proctor, London (GB); Edson Tirelli, Montreal (CA)

(73) Assignee: Red Hat, Inc., Raleigh, NC (US)

( * ) Notice: Subject to any disclaimer, the term of this patent is extended or adjusted under 35 U.S.C. 154(b) by 655 days.

(21) Appl. No.: 12/540,282

(22) Filed: Aug. 12, 2009

(65) Prior Publication Data

US 2011/0040714 A1  Feb. 17, 2011

(51) Int. Cl.
  *G06F 17/00* (2006.01)
  *G06N 5/00* (2006.01)
(52) U.S. Cl.
  USPC .......................................................... 706/45
(58) Field of Classification Search
  USPC .......................................................... 706/45
  See application file for complete search history.

(56) References Cited

PUBLICATIONS

J.N. Amaral and J. Ghosh, "Speeding Up Production Systems: From Concurrent Matching to Parallel Rule Firing", Parallel Processing for Artificial Intelligence, L. Kanal, et al., eds., 1993, pp. 1-22.*

Dale, Nell B., C++ Plus Data Structures, EBSCO Publishing, pp. 225-235, 2003.*

R. Doorenbos, Production Matching for Large Learning Systems, PhD dissertation, Carnegie Mellon University, Computer Science Department, pp. 1-194, Jan. 31, 1995.*

Luckham, David, "The Power of Events: An Introduction to Complex Event Processing in Distributed Enterprise Systems", Boston, MA: Addison-Wesley, 2002.

Gupta, A., et al., "High-Speed Implementations of Rule-Based Systems", ACM Transactions on Computer Systems, vol. 7, No. 2, May 1989, pp. 119-146.

* cited by examiner

*Primary Examiner* — Kakali Chaki
*Assistant Examiner* — Vincent Gonzales
(74) *Attorney, Agent, or Firm* — Lowenstein Sandler LLP

(57) ABSTRACT

Some embodiments of knowledgebase partitioning for implementing parallelization in a rule engine have been presented. In one embodiment, a compiler divides a knowledgebase into a set of virtual partitions. The knowledgebase includes a network constructed according to rules added to the knowledgebase. A rule engine may execute the virtual partitions of the partitioned knowledgebase in parallel using threads obtained from a pool of threads.

18 Claims, 9 Drawing Sheets

KNOWLEDGEBASE PARTITIONING

TECHNICAL FIELD

Embodiments of the present invention relate to artificial intelligence, and more specifically to rule engines.

BACKGROUND

The development and application of rule engines is one branch of Artificial Intelligence (A.I.), which is a very broad research area that focuses on "making computers think like people." Broadly speaking, a rule engine is a set of one or more software modules running on a computing device (e.g., a server, a personal computer, etc.) that processes information by applying rules to data objects (e.g., facts). A rule is a logical construct for describing the operations, definitions, conditions, and/or constraints that apply to some predetermined data to achieve a goal. Various types of rule engines have been developed to evaluate and process rules. Conventionally, a compiler compiles a rulebase containing a network constructed according to a set of rules. Then a rule engine evaluates the compiled rulebase against data objects, such as facts. The network may include many different types of nodes, including, for example, object-type nodes, alpha nodes, left-input-adapter nodes, eval nodes, join nodes, not nodes, and terminal nodes, etc.

Typically, facts enter a network at the root node, from which they are propagated to any matching object-type nodes. From a object-type node, a data object is propagated to either an alpha node (if there is a literal constraint), a left-input-adapter node (if the data object is the left most object type for the rule), or a beta node (such as a join node). However, connections between the nodes in the network are synchronous and typically, only one fact is propagated through the network at a time.

However, use cases like event processing, where a huge volume of data is processed, but a relatively low volume of actions are taken as a result of the processing, stress the evaluation algorithm to the most, while keeping the actual rule and/or query activations low. To support such scenarios, conventional event processing products run specialized algorithms that treat each rule or query on the event stream and/or cloud individually, allowing high parallelization but limiting the ability of optimizations. These algorithms do not perform well or even do not allow for rules reasoning.

On the other hand, trying to use conventional rule engine algorithms, like RETE, to process events is not feasible, due to the synchronization requirements of such algorithms. Namely, in order to ensure reasoning integrity, the algorithm forces synchronized reasoning, although, the actual matching algorithm accepts some level of parallelism as described by Charles Forgy, Anoop Gupta, and Allen Newel in the paper "High-Speed Implementations of Rule-Based Systems."

In this paper, they discuss the possible gains of Rete parallelization on three levels: matching, conflict resolution, and action steps. In particular, they describe a possible solution for rule parallelization as creating a network composed of multiple partitions, where each partition would include a single rule. Each rule could then be assigned a thread and be processed in parallel. As they note, this solution has a big drawback that is the loss of all the optimizations a Rete network could have, especially node sharing, that in their calculations increase processing cost by a factor of about 1.6.

BRIEF DESCRIPTION OF THE DRAWINGS

The present invention is illustrated by way of example, and not by way of limitation, in the figures of the accompanying drawings and in which.

DETAILED DESCRIPTION

Figure 1:
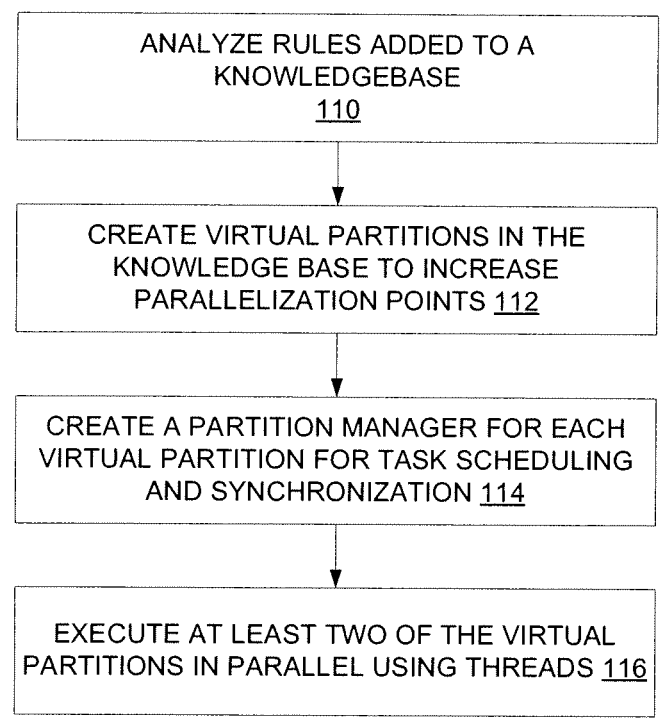
FIG. 1 illustrates one embodiment of a method to implement rule parallelization.

Described herein are some embodiments of knowledgebase partitioning for implementing parallelization in a rule engine. In one embodiment, a compiler divides a knowledgebase into a set of virtual partitions (or simply referred to as partitions). The knowledgebase includes a network constructed according to rules added to the knowledgebase. A rule engine may execute the virtual partitions of the partitioned knowledgebase in parallel using threads obtained from a pool of threads. Because the rule engine according to some embodiments of the invention processes rules and events in the same rulebase, unlike conventional rule engines that process rules and facts only, the rulebase is thus referred to as a "knowledgebase" in this document to distinguish it from rulebases created by conventional rule engines. Likewise, a rule session of the rule engine according to some embodiments of the invention is referred to as a "knowledge session" hereinafter for similar reason. More details of some embodiments of knowledgebase partitioning are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates one embodiment of a method to implement rule parallelization. The process may be performed by processing logic that may comprise hardware (e.g., circuitry, dedicated logic, programmable logic, microcode, etc.), software (such as instructions run on a processing device), firmware, or a combination thereof. For example, the compiler 510 and the rule engine 520 in FIG. 5 may perform at least part of the process in some embodiments.

Referring to FIG. 1, processing logic analyzes rules added to a knowledgebase (processing block 110). The knowledgebase may include a network (e.g., a Rete network) constructed according to the rules. The network typically includes various types of nodes, which are further discussed in details below. Then processing logic creates virtual partitions in the knowledgebase to increase parallelization points (processing block 112). A virtual partition (or simply referred to as a partition hereinafter) broadly refers to a logical dividing between nodes in a network. Thus, a virtual partition may also be viewed as a logical group of one or more nodes in the network. Parallelization points generally refer to points in the network at which parallel processing using multiple threads is possible.

In some embodiments, processing logic creates a partition manager for each virtual partition for task scheduling and synchronization (processing block 114). For example, the partition manager may request threads and manage the use of threads to propagate facts through nodes in its respective partition. More details of the partition manager are discussed below. Processing logic may execute at least two of the virtual partitions in parallel using threads (processing block 116).

Note that in a scenario where rules are completely disjoint without any possible optimization between them, the rule engine may create one virtual partition for each rule. However, as in the case with many rules, such as business rules, it is frequent that at least some rules share common patterns and constraints, and in this case, the above approach improves over the conventional approach by preserving the network optimizations, such as node sharing, alpha node hashing, etc.

In some embodiments, knowledgebase partitioning is provided as an optional feature in configuration, which can be enabled or disabled by rule engine users. To enable this configuration, the user may use a system property, a configuration file, or an application programming interface (API) call. One example using an API call is shown below:

KnowledgeBaseConfiguration
   config=KnowledgeBaseFactory.newKnowledgeBase
   Configuration ( );

config.setOption (MultithreadEvaluationOption.YES);

Once activated, the feature of knowledgebase partitioning may be divided into two components, namely, a compile time component and a runtime component. The compile time component may be implemented with a compiler and the runtime component may be implemented with a rule engine. Generally speaking, the compile time component partitions a knowledgebase, while the runtime component executes the partitions in the partitioned knowledgebase.

Figure 2:
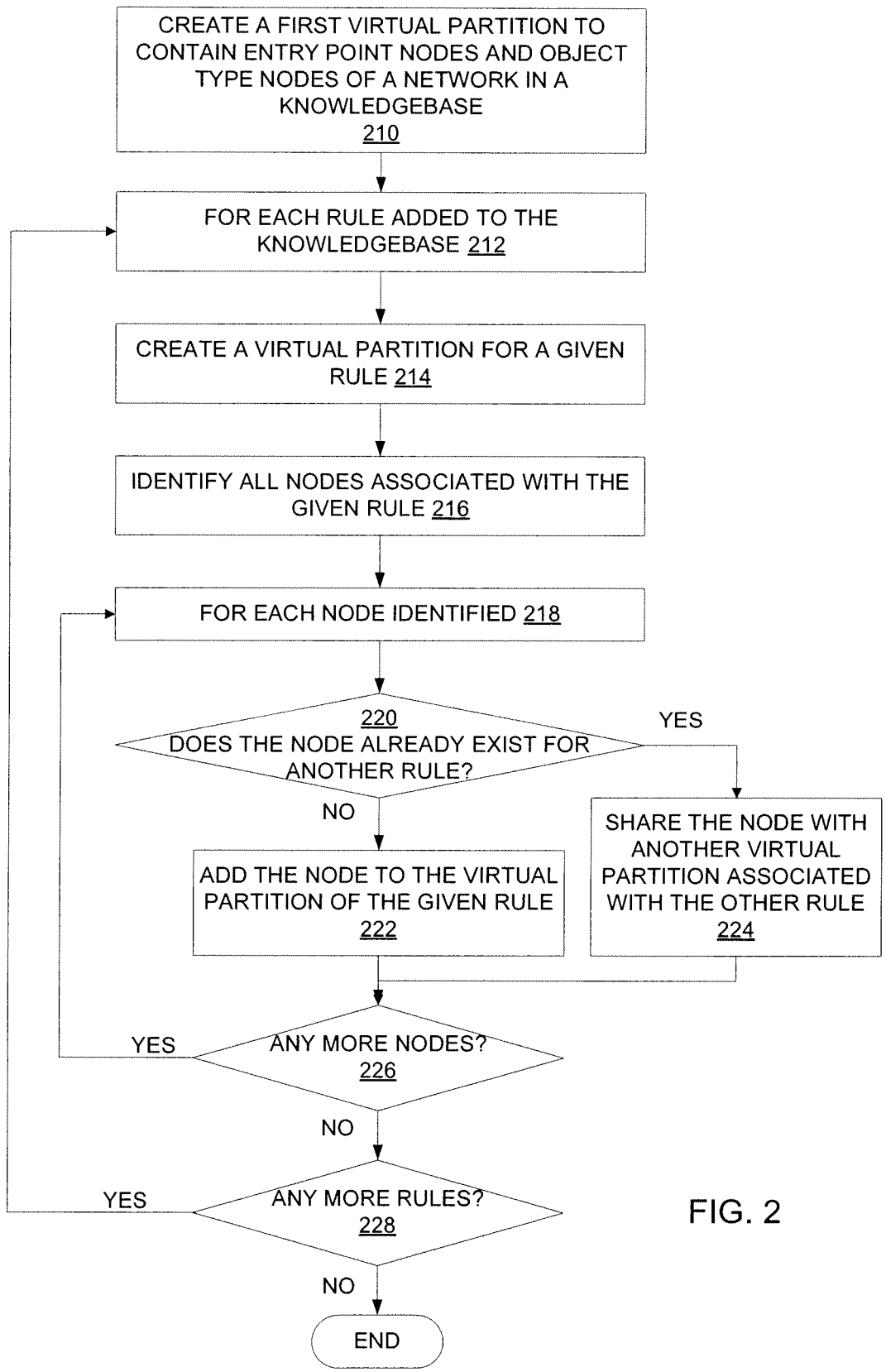
FIG. 2 illustrates one embodiment of a method to partition a knowledgebase.

FIG. 2 illustrates one embodiment of a method to partition a knowledgebase. The process may be performed by processing logic that may comprise hardware (e.g., circuitry, dedicated logic, programmable logic, microcode, etc.), software (such as instructions run on a processing device), firmware, or a combination thereof. For example, the compiler 510 in FIG. 5 may perform at least part of the process in some embodiments.

Referring to FIG. 2, processing logic creates a first virtual partition to contain entry point nodes and object type nodes of a network in a knowledgebase (processing block 210). For each rule added to the knowledgebase, processing logic creates a virtual partition for a given rule (processing block 214). Then processing logic identifies all nodes associated with the given rule (processing block 216).

For each node identified, processing block determines if the node already exists for another rule (processing block 220). If the node already exists for another rule, then processing logic allows the virtual partition of the given rule to share this node with the other virtual partition that contains this node (processing block 224). Otherwise, processing block adds the node to the virtual partition of the given rule (processing block 222). From either processing block 222 or processing block 224, processing logic transitions into processing block 226 to check if there are any more nodes associated with the given rule. If there is at least one more node, then processing logic transitions back to processing block 218 to repeat the above operations. Otherwise, processing logic checks if there are any more rules added in the knowledgebase (processing block 228). If there is at least one more rule, then processing logic transitions back to processing block 212 to repeat the above operations. Otherwise, the process ends. To further illustrate the above operations, one example is discussed in details below with reference to FIGS. 3A-3C.

In one example, the following rule is first added to a knowledgebase:

```
rule "Rule 1: Customer likes cheese"
when
    Customer( name == "Bob", $likes : likes )
    Cheese( price > 10, type == $likes )
then
    // do something
end
```

Figure 3A:
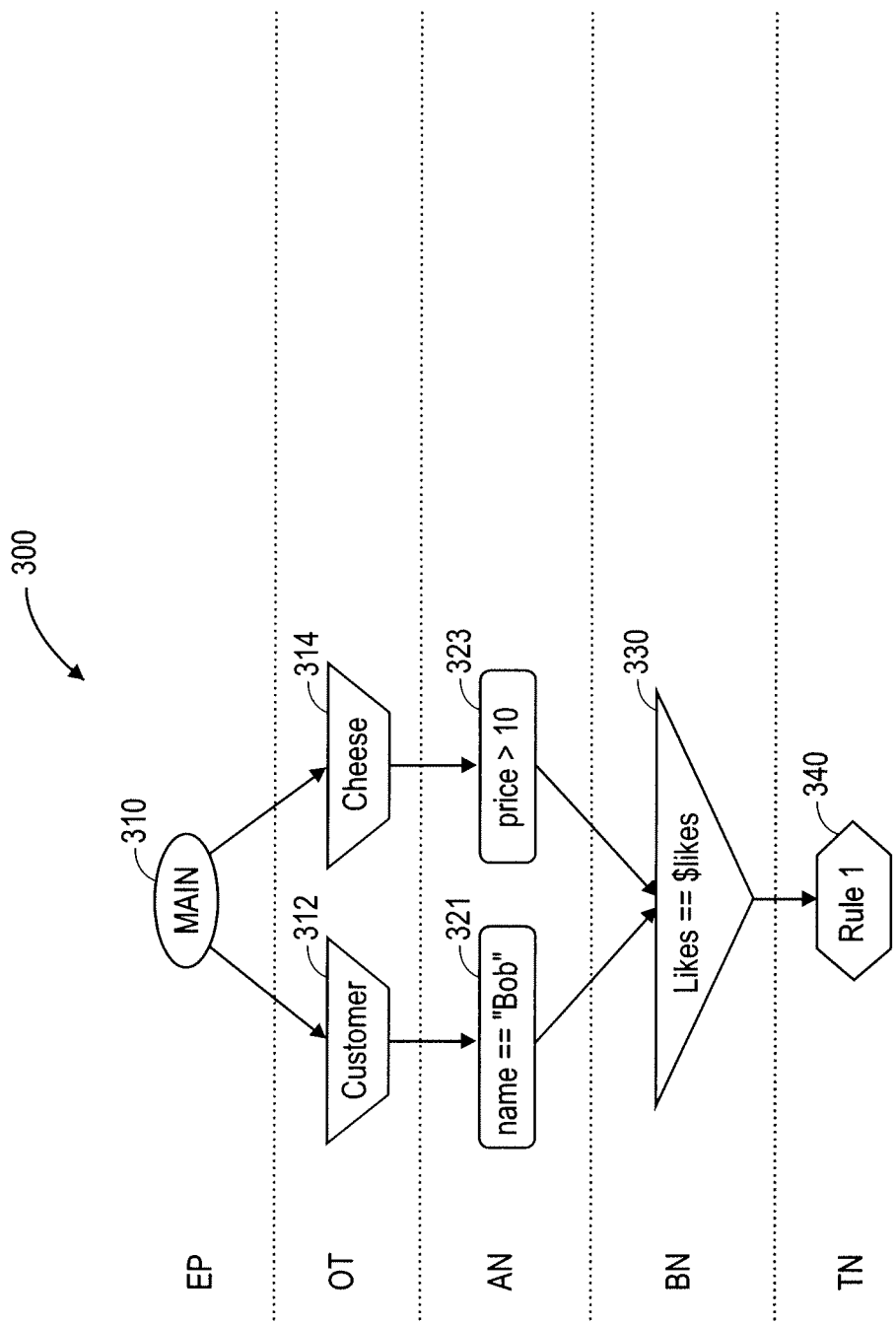
FIG. 3A illustrates one embodiment of a network in a knowledgebase.

A compiler may generate a network in the knowledgebase as illustrated in FIG. 3A for the above rule. In the network 300, each root node may also be referred to as an entry point. The name of the first entry point 310 is implicitly called "EntryPoint:MAIN" and each subsequent entry point may receive a name explicitly defined by a rule engine user. Following the entry point 310 are object type nodes (OTNs) 312 and 314. The OTNs may be followed by alpha network (AN), which is a sequence of nodes responsible for evaluating alpha constraints. In FIG. 3A, the ANs 321 and 323 are each represented as a single node for simplicity, but there can be from zero to many nodes in the AN, following each of the OTNs. Following the ANs is a beta network (BN), which is a sequence of nodes responsible for joining branches in the network 300 and applying the beta constraints. In FIG. 3A, the BN 330 is represented as a single node for simplicity, but there can be from zero to many BNs preceding each terminal node. Finally, the network 300 includes a terminal node (TN) for each of the rules in the knowledgebase. For example, TN 340 is for the rule set forth above.

Figure 3B:
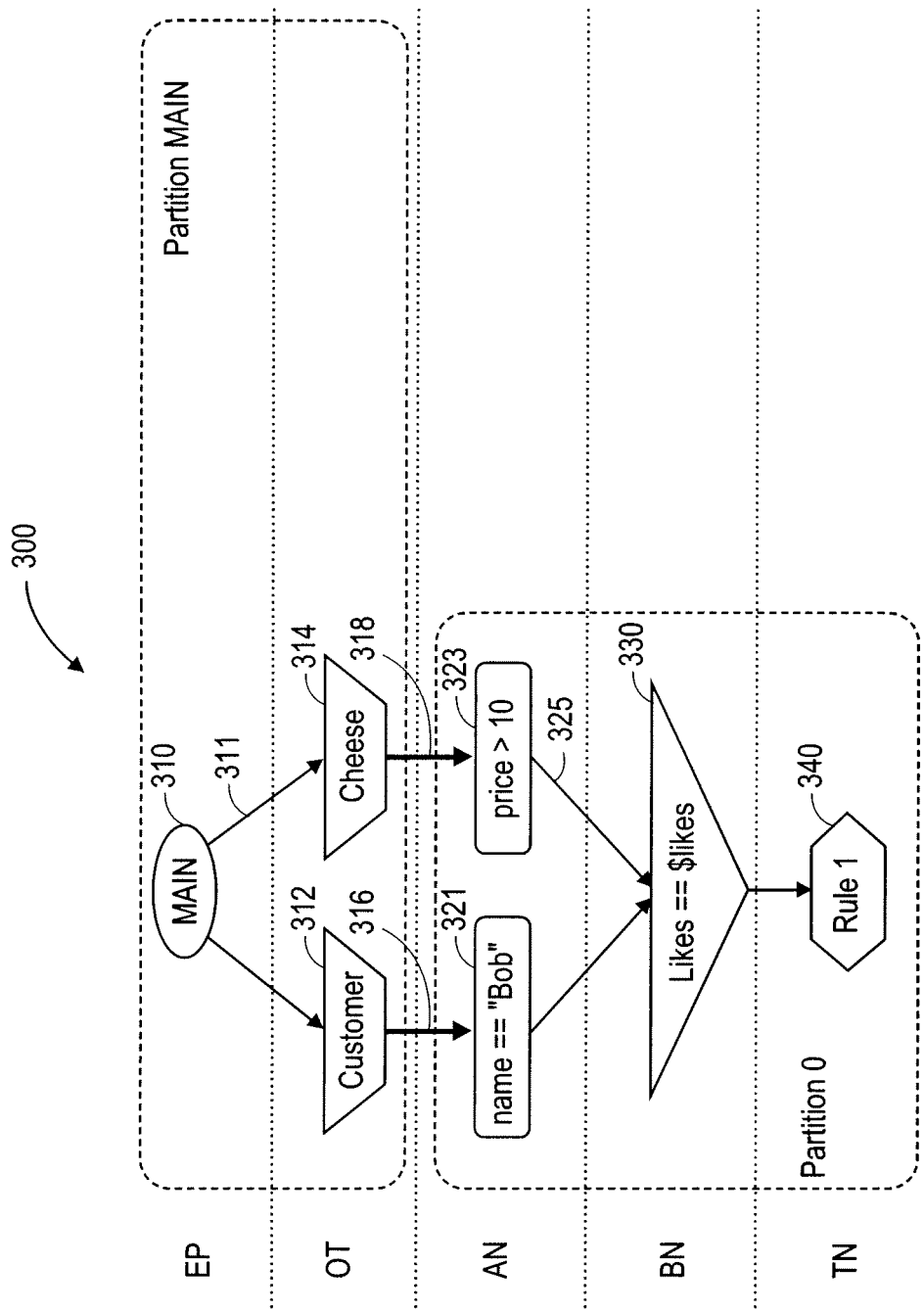
FIG. 3B illustrates one embodiment of a partitioned knowledgebase.

In some embodiments, the compiler creates a virtual partition that contains all the entry point nodes and the OTNs. This virtual partition may be called "MAIN," as shown in FIG. 3B. Then all the nodes for that rule may be added to a new virtual partition, sequentially numbered for simplicity, unless they already exist for another rule, in which case, they may be shared. Since this is the first rule added into the knowledgebase, there is no sharing and there is one more virtual partition, i.e., Partition 0, in addition to Partition MAIN in FIG. 3B. To determine to which virtual partition each node belongs to, a label may be added to the node with the corresponding virtual partition label.

In some embodiments, the connections between nodes inside the same virtual partition are regular synchronous connection, such as connections 311 and 325, but connections between nodes of different partitions are asynchronous, such as connections 316 and 318. Furthermore, each of the asynchronous connections may have a queue, which may also be referred to as a built-in queue. Facts reaching an asynchronous connection may be put into the queue temporarily during execution of the partitions. More details of the use of the queue are discussed below.

When a new rule is added to the knowledgebase, the compiler may identify which nodes can be shared and reuse them. New nodes are added as usual and a new partition is created for the new non-shared nodes. For instance, suppose the following rule is added to the knowledgebase:

```
rule "Rule 2: Order cheese"
when
    Cheese( price > 10, $cheese : this )
    OrderEvent( product == $cheese ) from entry-point "Orders"
then
    // do something
end
```

Figure 3C:
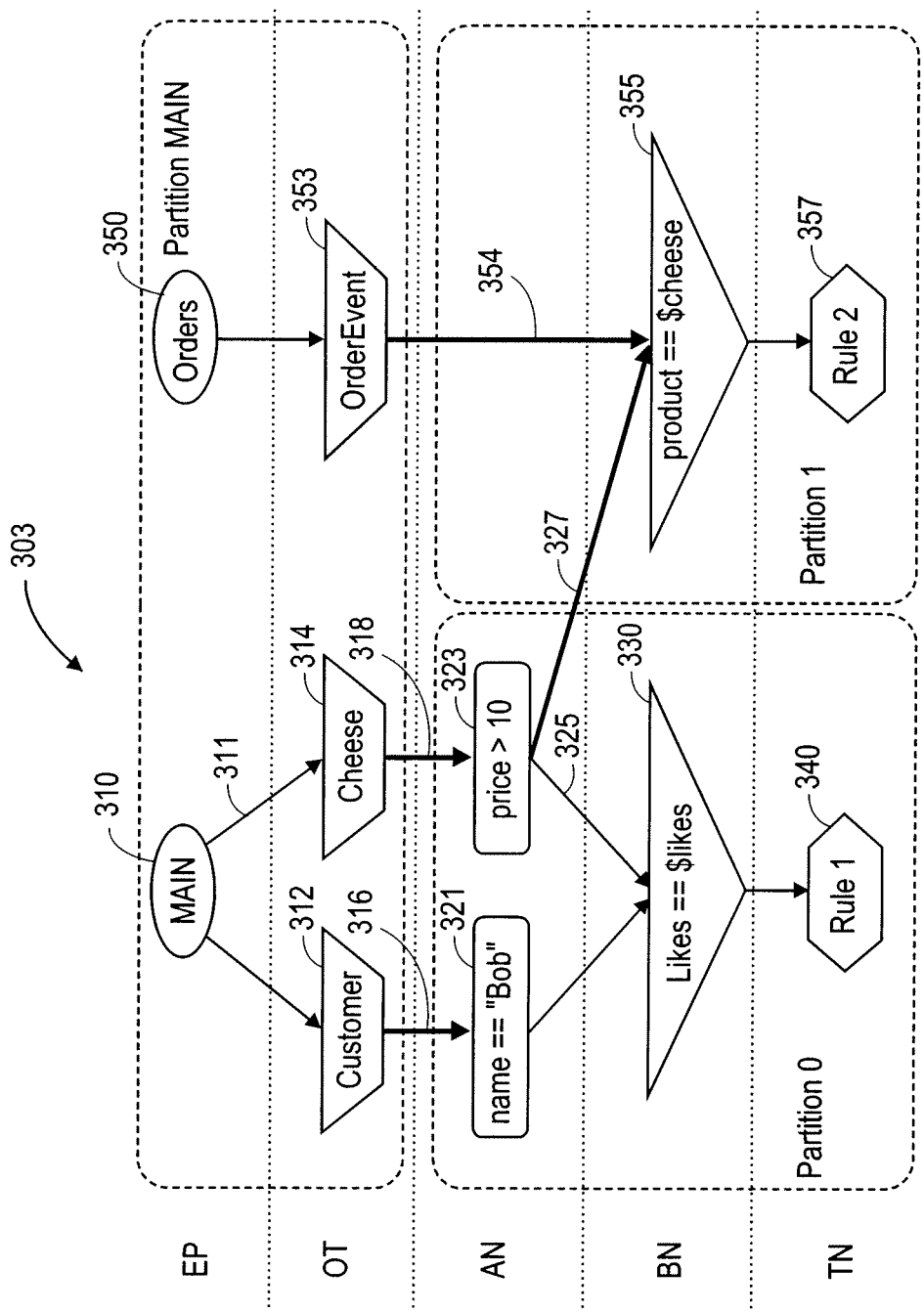
FIG. 3C illustrates one embodiment of a partitioned knowledgebase.

In response to the addition of the above rule (i.e., Rule 2), the network 300 in FIG. 3B is further expanded as illustrated in FIG. 3C. In FIG. 3C, the network 303 has three partitions, namely, Partition MAIN, Partition 0, and a newly created Partition 1. As shown in FIG. 3C, the nodes for the Cheese pattern (i.e., nodes 314 and 323) are reused because these nodes already exist in Partition MAIN and Partition 0, respectively. A new entry point node "Orders" 350 and a new OTN "OrderEvent" 353 are created inside Partition MAIN. The rest of the new nodes associated with Rule 2 (i.e., nodes 355 and 357) are created inside the new partition, Partition 1.

As previously explained, all connections between different partitions in FIG. 3C are asynchronous. So, the connection 327 between the AN "price>10" 323 and BN "product==$cheese" 355 is an asynchronous connection. Likewise, the connection 354 between "orderEvent" 353 and "product==$cheese" 355 is also asynchronous.

After dividing the knowledgebase into partitions, a rule engine can execute the partitions using threads. A thread generally refers to an instance of a sequence of code that is operating as a unit, typically on behalf of a single user, transaction, or message. A thread may run on a processing device (e.g., a central processing unit, a multi-core processor, etc.) to perform one or more tasks. Multiple threads can run concurrently on the same processing device. Thus, threads are useful in parallelization.

Figure 4:
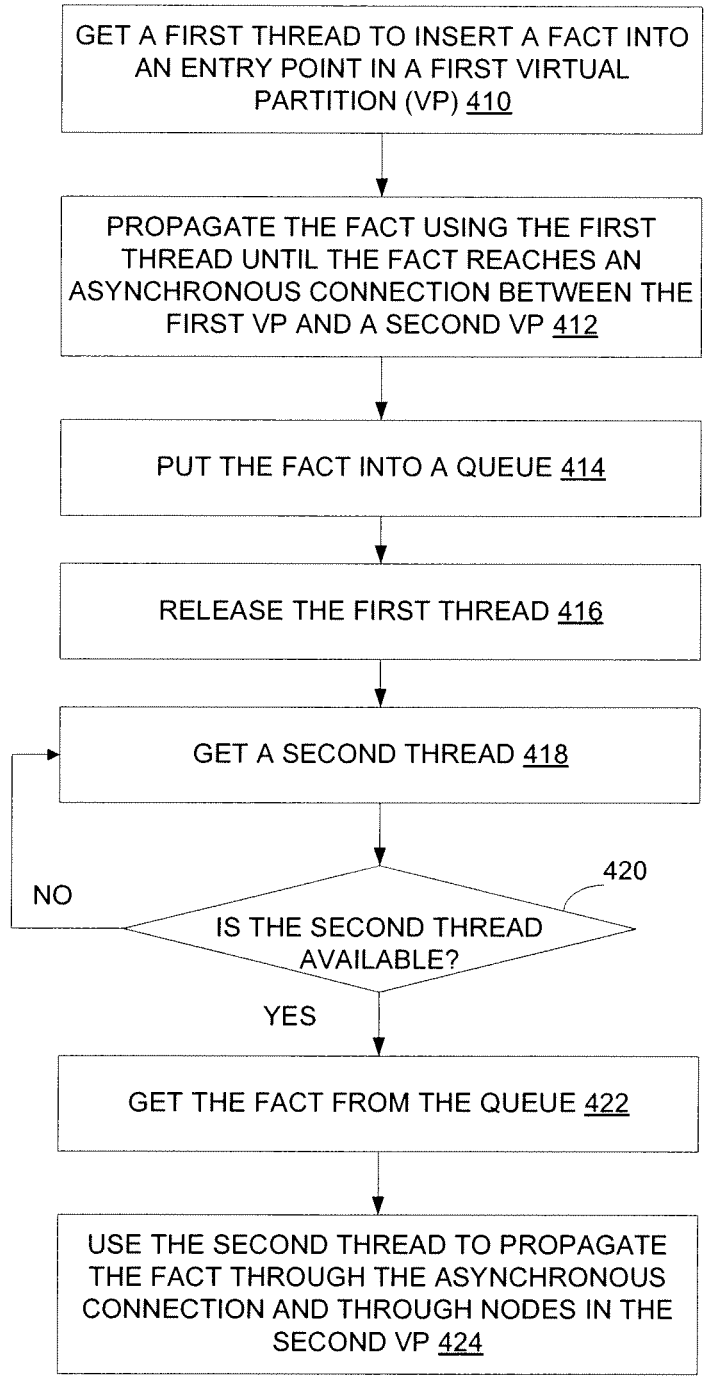
FIG. 4 shows one embodiment of a method to execute a partitioned knowledgebase.

FIG. 4 shows one embodiment of a method to execute a partitioned knowledgebase, such as the partitioned knowledgebase in FIG. 3C. The process may be performed by processing logic that may comprise hardware (e.g., circuitry, dedicated logic, programmable logic, microcode, etc.), software (such as instructions run on a processing device), firmware, or a combination thereof. For example, the rule engine 520 in FIG. 5 may perform at least part of the process in some embodiments.

Referring to FIG. 4, processing logic gets a first thread from a pool of threads to insert a fact into an entry point in a first virtual partition (processing block 410). Then processing logic propagates the fact using the first thread until the fact reaches an asynchronous connection between the first virtual partition and a second virtual partition (processing block 412). As mentioned above, there may be a queue at each asynchronous connection. Processing logic may put the fact into the queue (processing block 414) and release the first thread (processing block 416).

In some embodiments, processing logic gets a second thread from the pool of threads (processing block 418). Processing logic checks if the second thread is available at processing block 420. If the second thread is not available, then processing logic returns to processing block 418. Otherwise, processing logic gets the fact from the queue (processing block 422) and uses the second thread to propagate the fact through the asynchronous connection into the second virtual partition, and then through nodes in the second virtual partition (processing block 424). When a fact reaches a terminal node associated with a rule in the network, the rule is fully matched. Thus, processing logic may put the rule into an agenda of the rule engine to be fired or activated (processing block 426). Firing a rule may cause actions to be performed as a result of the rule being matched. To further illustrate the above method, one example is discussed in details below with reference to the network 303C in FIG. 3C.

As mentioned above, at least some of the virtual partitions are executed in parallel by threads, which may include light-weight threads. Light-weight threads typically refer to user-level threads, which has little amount of context saved with it, compared to other types of threads. In some embodiments, the threads are configured into a pool of worker threads. The size of the pool is configurable by one of several ways, such as using a system property, using a configuration file, or an API call, etc. The following is one example of using the API to configure a thread pool of size five (5):
KnowledgeBaseConfiguration
 config=KnowledgeBaseFactory.newKnowledgeBase
 Configuration( );
config.setOption(MaxThreadsOption.get(5));

Given the previous information of thread pool size and the list of all partitions created at compile time, when a user creates a new knowledge session for the given knowledgebase, the rule engine may internally create a partition manager for each virtual partition and the pool of threads. The partition manager is responsible for task scheduling and synchronization of the virtual partition it is assigned to. The mapping between virtual partitions and partition managers may be one-to-one.

Referring back to the previous example shown in FIG. 3C, when a Customer fact is inserted into the knowledgebase through a working memory of the rule engine, it enters the network 303 with a synchronous operation through the MAIN entry point 310, propagates to the Customer OTN 312 with another synchronous operation, and then reaches an asynchronous connection when propagating to the AN "name=="Bob"" 321. At this point, the thread that inserted the fact into the working memory returns to the main application to continue its work, while a new thread is requested by the partition manager of Partition 0, Partition Manager 0 (PM0). When a worker thread is assigned to PM0, the worker thread gets the Customer fact from the built-in queue of the asynchronous connection 316, propagates it to the AN 321 and then down the network 303 as usual, since all connections below the AN 321 are synchronous. When the propagation is finished, PM0 releases the worker thread and waits for new propagations.

Similarly, when a Cheese fact is inserted into the network 303, it may propagate as previously described until it reaches the AN "price>10" 323. At this point, there are two propagation paths: one synchronous (i.e., connection 325) that will be executed by the same thread that PM0 is already using, and the other, asynchronous (i.e., connection 327) that will be placed on the built-in queue of partition manager of Partition 1, i.e., PM1, for BN "product==$cheese" 355. PM1 may then request a worker thread and behave in the same way as PM0, although for Partition 1.

The above approach ensures that at any given time, only one worker thread is assigned to each virtual partition. But multiple worker threads might be propagating facts in different virtual partitions. Thus, parallelization may be achieved while preserving other optimizations made to the network 303. Also, synchronization between the agenda that is firing rules and the network is done to avoid a rule firing while a potential match could be cancelling it.

One of the many improvements of the above approach over the conventional approach is that this new approach not only preserves all optimizations of the network, including node sharing, but also other optimizations that an object oriented network implements, such as alpha node hashing, rules versus data split (which allows knowledgebase sharing among sessions), constraint Just-In-Time compilation (JITing), etc. Also, the above approach makes use of computational resources not available to the original approach, like light-weight threads and in-process light-weight synchronization mechanisms.

Figure 5:
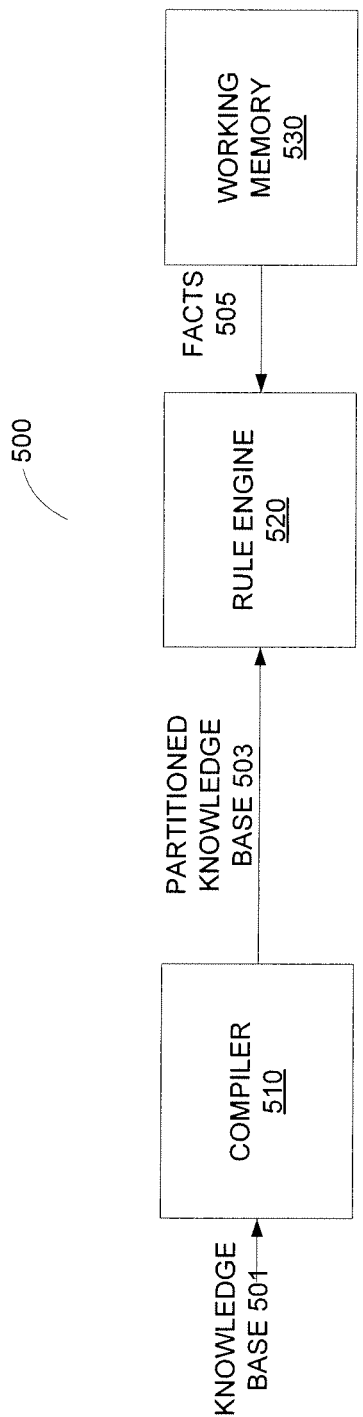
FIG. 5 shows one embodiment of a compiler and a rule engine usable with some embodiments of the present invention.

FIG. 5 shows one embodiment of a compiler and a rule engine usable with some embodiments of the present invention. The system 500 in FIG. 5 includes a compiler 510 and a rule engine 520. A knowledgebase 501 with one or more rules added may be input to the compiler 510. The compiler 510 may analyze the network in the knowledgebase 501 built according to the rules and divide the knowledgebase into multiple virtual partitions. Details of some embodiments of partitioning a knowledgebase have been discussed above with reference to FIGS. 2 and 3A-3C.

The partitioned knowledgebase 503 is then provided to the rule engine 520, which may execute the partitions in the knowledgebase 503 as discussed above with reference to FIGS. 4 and 3C. For example, a rule engine user may assert facts into a working memory 530 of the rule engine 520. The facts 505 asserted may be inserted into various entry points of the network of the partitioned knowledgebase 503. The rule engine 520 may use threads to propagate the facts 505 through the network as discussed above.

Figure 6A:
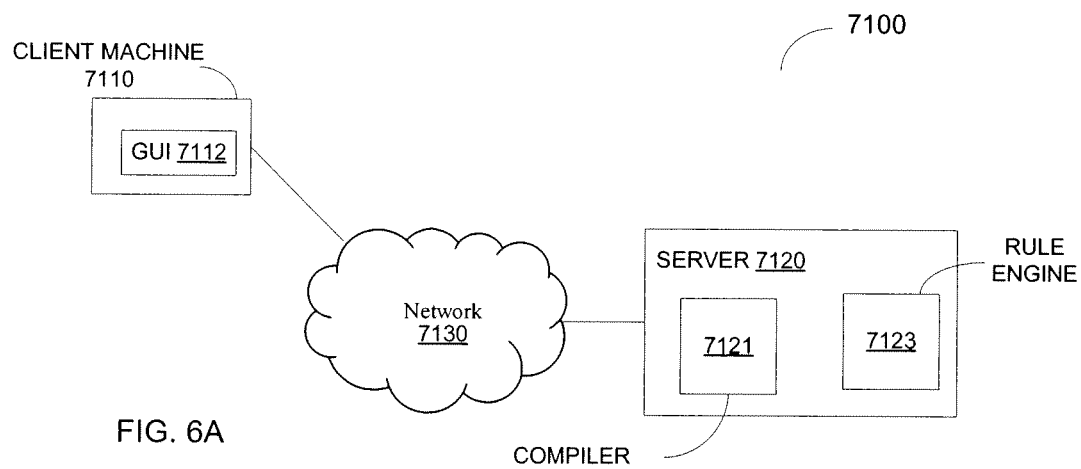
FIG. 6A shows one embodiment of a system usable with some embodiments of the present invention.

FIG. 6A illustrates one embodiment of a system usable with some embodiments of the present invention. The system 7100 includes a client machine 7110 and a server 7120, which are coupled to each other via a network 7130. The client machine 7110 may include a computing machine, such as a desktop personal computer (PC), a laptop PC, a personal digital assistant (PDA), a mobile telephone, etc. The network 7130 coupling the client machine 7110 to the server 7120 may include various kinds of networks, such as an intranet, the Internet, etc. The server 7120 may be implemented using the computer system 700 as illustrated in FIG. 7.

In some embodiments, the server 7120 includes a rule engine 7123 such as the rule engine 520 shown in FIG. 5, and a compiler 7121, such as the compiler 510 shown in FIG. 5. The client machine 7110 may present a GUI 7112 (e.g., a webpage rendered by a browser) to allow users to input rules, events, and/or facts, which may be sent to the server 7120 to be processed using the compiler 7121 and the rule engine 7123 as discussed above.

Figure 6B:
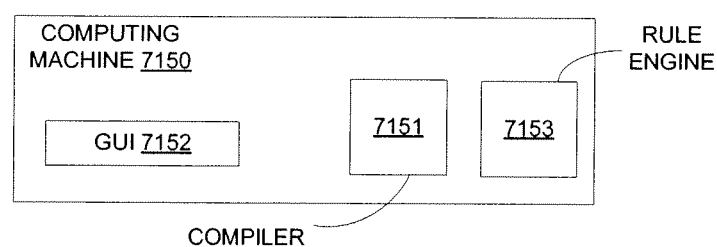
FIG. 6B shows an alternate embodiment of a system usable with some embodiments of the present invention.

FIG. 6B illustrates an alternate embodiment of a system usable with some embodiments of the present invention. The system 7200 includes a computing machine 7150, which may be implemented using the computer system 700 illustrated in FIG. 7. The computing machine 7150 includes a compiler 7151, a rule engine 7153, and a GUI 7152. Some embodiments of the compiler 7151 and the rule engine 7153 have been discussed above with reference to FIG. 5. In some embodiments, users may input files for rules using the GUI 7152. Then the files may be processed by the compiler 7151 and the rule engine 7153 as discussed above.

Figure 7:
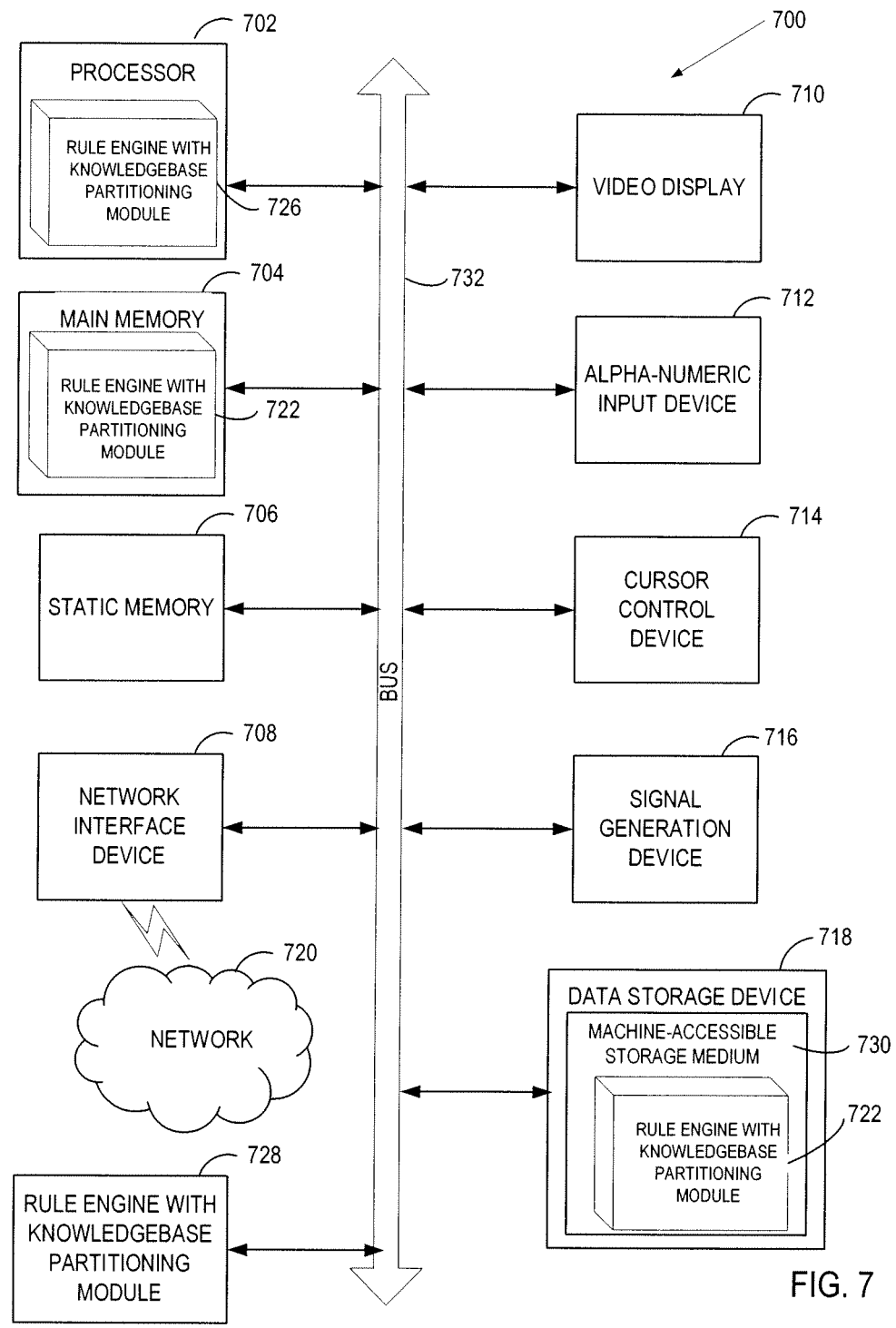
FIG. 7 illustrates a block diagram of an exemplary computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a laptop PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) such as synchronous DRAM (SDRAM), etc.), a static memory 706 (e.g., flash memory, static random access memory (SRAM), etc.), and a data storage device 718, which communicate with each other via a bus 732.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the rule engine with knowledgebase partitioning module 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 (also known as a computer-readable storage medium) on which is stored one or more sets of instructions (e.g., rule engine with knowledgebase partitioning module 722) embodying any one or more of the methodologies or functions described herein. The rule engine with knowledgebase partitioning module 722 may also reside, completely or at least partially, within the main memory 704 and/or within the processing device 702 during execution thereof by the computer system 700, the main memory 704 and the processing device 702 also constituting machine-accessible storage media. The rule engine with knowledgebase partitioning module 722 may further be transmitted or received over a network 720 via the network interface device 708.

While the machine-accessible storage medium 730 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, optical and magnetic media, etc.

The module, rule engine with knowledgebase partitioning module 728, components and other features described herein (for example, in relation to FIG. 5) can be implemented as discrete hardware components or integrated into the functionalities of hardware components, such as ASICS, FPGAs, DSPs, or similar devices. In addition, the rule engine with knowledgebase partitioning module 728 can be implemented as firmware or functional circuitries within hardware devices. Further, the rule engine with knowledgebase partitioning module 728 can be implemented in any combination of hardware devices and software components.

Thus, some embodiments of knowledgebase partitioning have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
a compiler, running on a server, dividing a knowledgebase into a plurality of virtual partitions, the knowledgebase comprising a network constructed according to a plurality of rules, said dividing comprising:
for each rule of the plurality of rules:
creating a virtual partition corresponding to the rule and identifying nodes for the rule, and for each node identified:
determining if a node in the network associated with the rule in the knowledgebase already exists for another rule in the knowledgebase;
adding the node to the virtual partition associated with the rule if the node does not exist for another rule in the knowledgebase; and
allowing the virtual partition associated with the rule to share the node with a second virtual partition associated with a second rule if the node already exists for the second rule in the knowledgebase; and
a rule engine, running on the server, executing the plurality of virtual partitions in parallel by threads from a plurality of threads;
the rule engine using a first thread of the plurality of threads to propagate a fact through a first plurality of nodes in a first virtual partition; and
upon the fact reaching an asynchronous connection between the first virtual partition and a second virtual partition, the rule engine using a second thread of the plurality of threads to propagate the fact through a second plurality of nodes in the second virtual partition,
wherein at least one of the first plurality of nodes or the second plurality of nodes comprises a pair of nodes associated with different rules.

2. The method of claim 1, further comprising:
the rule engine creating a partition manager for each of the plurality of virtual partitions for task scheduling and synchronization of a respective virtual partition.

3. The method of claim 1, wherein only one of the plurality of threads is assigned to one of the plurality of virtual partitions at any given time.

4. The method of claim 1, further comprising:
the compiler creating a first virtual partition to contain one or more entry point nodes and object type nodes of the network.

5. The method of claim 1, wherein connections between nodes of different ones of the plurality of virtual partitions are asynchronous, and connections between nodes within each of the plurality of virtual partitions are synchronous.

6. The method of claim 1, further comprising:
the rule engine putting the fact into a queue when the fact reaches the asynchronous connection between the first virtual partition and the second virtual partition.

7. An apparatus comprising:
a compiler, running on the server, to divide a knowledgebase into a plurality of virtual partitions, the knowledgebase comprising a network constructed according to a plurality of rule, said dividing comprising:
for each rule of the plurality of rules:
creating a virtual partition corresponding to the rule and identifying nodes for the rule, and for each node identified:
determining if a node in the network associated with the rule in the knowledgebase already exists for another rule in the knowledgebase;
adding the node to the virtual partition associated with the rule if the node does not exist for another rule in the knowledgebase; and
allowing the virtual partition associated with the rule to share the node with a second virtual partition associated with a second rule if the node already exists for the second rule in the knowledgebase; and
a rule engine:
to execute the plurality of virtual partitions in parallel by threads from a plurality of threads,
to use a first thread of the plurality of threads to propagate a fact through a first plurality of nodes in a first virtual partition, and
upon the fact reaching an asynchronous connection between the first virtual partition and a second virtual partition, to use a second thread of the plurality of threads to propagate the fact through a second plurality of nodes in the second virtual partition, wherein at least one of the first plurality of nodes or the second plurality of nodes comprises a pair of nodes associated with different rules.

8. The apparatus of claim 7, further comprising:
a plurality of partition managers, one for each of the plurality of virtual partitions to perform task scheduling and synchronization of a respective virtual partition.

9. The apparatus of claim 7, wherein only one of the plurality of threads is assigned to one of the plurality of virtual partitions at any given time.

10. The apparatus of claim 7, wherein a first one of the plurality of virtual partitions contains one or more entry point nodes and object type nodes of the network.

11. The apparatus of claim 7, wherein connections between nodes of different ones of the plurality of virtual partitions are asynchronous, and connections between nodes within each of the plurality of virtual partitions are synchronous.

12. The apparatus of claim 7, wherein the rule engine puts the fact into a queue when the fact reaches the asynchronous connection between the first virtual partition and the second virtual partition.

13. A non-transitory computer-readable storage medium embodying instructions that, when executed by a server, will cause the server to perform operations comprising:
a compiler, running on the server, dividing a knowledgebase into a plurality of virtual partitions, the knowledgebase comprising a network constructed according to a plurality of rules said dividing comprising:
for each rule of the plurality of rules:
creating a virtual partition corresponding to the rule and
identifying nodes for the rule, and for each node identified:
determining if a node in the network associated with the rule in the knowledgebase already exists for another rule in the knowledgebase;
adding the node to the virtual partition associated with the rule if the node does not exist for another rule in the knowledgebase; and
allowing the virtual partition associated with the rule to share the node with a second virtual partition associated with a second rule if the node already exists for the second rule in the knowledgebase; and
a rule engine, running on the server, executing the plurality of virtual partitions in parallel by threads from a plurality of threads;
the rule engine using a first thread of the plurality of threads to propagate a fact through a first plurality of nodes in a first virtual partition; and
upon the fact reaching an asynchronous connection between the first virtual partition and a second virtual partition, the rule engine using a second thread of the plurality of threads to propagate the fact through a second plurality of nodes in the second virtual partition, wherein at least one of the first plurality of nodes or the second plurality of nodes comprises a pair of nodes associated with different rules.

14. The non-transitory computer-readable storage medium of claim 13, further comprising:
the rule engine creating a partition manager for each of the plurality of virtual partitions for task scheduling and synchronization of a respective virtual partition.

15. The non-transitory computer-readable storage medium of claim 13, wherein only one of the plurality of threads is assigned to one of the plurality of virtual partitions at any given time.

16. The non-transitory computer-readable storage medium of claim 13, further comprising:
the compiler creating a first virtual partition to contain one or more entry point nodes and object type nodes of the network.

17. The non-transitory computer-readable storage medium of claim 13, wherein connections between nodes of different ones of the plurality of virtual partitions are asynchronous, and connections between nodes within each of the plurality of virtual partitions are synchronous.

18. The non-transitory computer-readable storage medium of claim 13, further comprising:
the rule engine putting the fact into a queue when the fact reaches the asynchronous connection between the first virtual partition and the second virtual partition.

* * * * *